United States Patent
Yi et al.

(10) Patent No.: US 11,768,706 B2
(45) Date of Patent: *Sep. 26, 2023

(54) METHOD, STORAGE MEDIUM STORING INSTRUCTIONS, AND APPARATUS FOR IMPLEMENTING HARDWARE RESOURCE ALLOCATION ACCORDING TO USER-REQUESTED RESOURCE QUANTITY

(71) Applicant: TENCENT TECHNOLOGY (SHENZHEN) COMPANY LIMITED, Guangdong (CN)

(72) Inventors: Guwu Yi, Guangdong (CN); Biao Xu, Guangdong (CN); Fan Yang, Guangdong (CN); Jue Wang, Guangdong (CN); Rui Yang, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 136 days.

This patent is subject to a terminal disclaimer.

(21) Appl. No.: 17/396,584

(22) Filed: Aug. 6, 2021

(65) Prior Publication Data
US 2021/0365295 A1    Nov. 25, 2021

Related U.S. Application Data

(63) Continuation of application No. 16/284,455, filed on Feb. 25, 2019, now Pat. No. 11,132,229, which is a
(Continued)

(30) Foreign Application Priority Data

Dec. 13, 2016  (CN) .......................... 201611146923.3

(51) Int. Cl.
*G06F 9/50* (2006.01)

(52) U.S. Cl.
CPC .......... *G06F 9/5016* (2013.01); *G06F 9/5011* (2013.01); *G06F 2209/5013* (2013.01)

(58) Field of Classification Search
None
See application file for complete search history.

(56) References Cited

U.S. PATENT DOCUMENTS 7,039,915 B2   5/2006 Kavoori
7,137,119 B1 * 11/2006 Sankaranarayan ... G06F 9/5011
718/103

(Continued)

FOREIGN PATENT DOCUMENTS

CN       103440172      12/2013
CN       105512091       4/2016
(Continued)

OTHER PUBLICATIONS

Grode et al. "Hardware Resource Allocation for Hardware/Software Partitioning in the LYCOS System", 1998 IEEE, 6 pages.*
(Continued)

*Primary Examiner* — Van H Nguyen
(74) *Attorney, Agent, or Firm* — ARENTFOX SCHIFF LLP (57) ABSTRACT

The aspects of the present disclosure provide a method and an apparatus for implementing hardware resource allocation. For example, the apparatus includes processing circuitry. The processing circuitry obtains a first value that is indicative of an allocable resource quantity of a hardware resource in a computing device. The processing circuitry also receives a second value that is indicative of a requested resource quantity of the hardware resource by a user, and then determines whether the second value is greater than the first value. When the second value is determined to be less than or equal to the first value, the processing circuitry requests the computing device to allocate the hardware
(Continued)

resource of the requested resource quantity to the user, and subtracts the second value from the first value to update the allocable resource quantity of the hardware resource in the computing device.

20 Claims, 4 Drawing Sheets

Related U.S. Application Data continuation of application No. PCT/CN2017/112254, filed on Nov. 22, 2017.

(56) References Cited

U.S. PATENT DOCUMENTS

| | | |
|---|---|---|
| 9,519,515 B2 | 12/2016 | Calcaterra |
| 9,542,221 B2 * | 1/2017 | Harris .................. G06F 9/5011 |
| 9,772,881 B2 | 9/2017 | Jin |
| 10,277,911 B2 | 4/2019 | Zenoni |
| 2005/0149939 A1 | 7/2005 | Noeske |
| 2017/0214927 A1 | 7/2017 | Zenoni |

FOREIGN PATENT DOCUMENTS

| | | |
|---|---|---|
| CN | 105589750 | 5/2016 |
| CN | 106598737 | 4/2017 |
| WO | 9902000 | 1/1999 |

OTHER PUBLICATIONS

Li et al. "A Page-based Hybrid (Software-Hardware) Dynamic Memory Allocator", 2006 IEEE, 4 pages.*
International Search Report dated Feb. 23, 2018 in PCT/CN2017/112254 filed Nov. 22, 2017. (With English Translation), p. 1-6.
Written Opinion of the International Searching Authority dated Feb. 23, 2018 in PCT/CN2017/112254 filed Nov. 22, 2017, p. 1-5.

* cited by examiner

METHOD, STORAGE MEDIUM STORING INSTRUCTIONS, AND APPARATUS FOR IMPLEMENTING HARDWARE RESOURCE ALLOCATION ACCORDING TO USER-REQUESTED RESOURCE QUANTITY

RELATED APPLICATION

This application is a continuation of U.S. application Ser. No. 16/284,455, filed Feb. 25, 2019, and issued on Sep. 28, 2021, as U.S. Pat. No. 11,132,229, which is a continuation of International Application No. PCT/CN2017/112254, filed on Nov. 22, 2017, which claims priority to Chinese Patent Application No. 201611146923.3, entitled "METHOD AND APPARATUS FOR IMPLEMENTING HARDWARE RESOURCE ALLOCATION" filed with the Patent Office of China on Dec. 13, 2016. The entire disclosures of the prior applications are hereby incorporated by reference in their entirety.

FIELD OF THE TECHNOLOGY

The present disclosure relates to the field of the Internet, and specifically to a method and an apparatus for implementing hardware resource allocation, and a storage medium.

BACKGROUND OF THE DISCLOSURE

Resources of a computing device may be divided into a computing resource and a storage resource, where the computing resource such as a CPU (Central Processing Unit) or a memory is mainly used for computing, and the storage resource is mainly used to read/write data, and may be undertaken by a magnetic disk. With advancements in hardware technologies, a computing resource and a storage resource of a single computing device become increasingly large, and moreover a unit cost also becomes increasingly low. With hardware performance improvement of a single computing device, to make full use of a hardware capability of the computing device, a plurality of application programs may be deployed in the computing device. For example, a plurality of database applications is deployed into one computing device, so as to reduce a use cost of a single database application.

In a cloud technology, particularly, in a virtualized environment, a hardware resource in a computing device is usually subleased to different users for use by means of an application program, and these users to which the application program is subleased may be referred to as tenants. A plurality of application programs is deployed in one computing device. In this way, a hardware resource of the one computing device is leased by a plurality of tenants. Currently, a plurality of tenants uses a hardware resource of a computing device in a manner of allocation and scheduling based on an operating system, and a preemption-based hardware resource allocation and use policy is usually used. That is, a busy application program may preempt the hardware resource of the computing device and use the hardware resource for computing and storage of the busy application program. However, in this scenario, an idle application program cannot obtain the hardware resource used for computing and storage, and a processing capability of the idle application program is greatly reduced. In a fair multi-tenant environment, the hardware resource allocation manner in the related technology is unfair to a tenant of the idle application program.

SUMMARY

In view of this, aspects of the present disclosure provide a method and an apparatus for implementing hardware resource allocation, and a non-transitory computer-readable storage medium, so as to resolve a technical problem in the related technology that hardware resource allocation performed in a preemption-based manner causes a processing capability of an idle application program to be reduced.

In some examples, the apparatus includes processing circuitry. The processing circuitry obtains a first value that is indicative of an allocable resource quantity of a hardware resource in a computing device. The processing circuitry also receives a second value that is indicative of a requested resource quantity of the hardware resource by a user, and then determines whether the second value is less than or equal to the first value. When the second value is determined to be less than or equal to the first value, the processing circuitry requests the computing device to allocate the hardware resource of the requested resource quantity to the user, and subtracts the second value from the first value to update the allocable resource quantity of the hardware resource in the computing device.

According to an aspect of the disclosure, the processing circuitry selects the computing device from a first computing device and a second computing device that are available for hardware resource allocation. Then the processing circuitry compares the second value with the first value of the selected computing device. When the second value is determined to be greater than the first value, the processing circuitry selects the other of the first computing device and the second computing device for the hardware resource allocation.

In some embodiments, the processing circuitry obtains the first value that is indicative of the allocable resource quantity of at least one of a disk space and a memory space in the computing device.

In some embodiments, the processing circuitry receives the second value that is indicative of the requested resource quantity of the hardware resource for a database application.

In some embodiments, when the computing device is implemented in the apparatus, the processing circuitry allocates the hardware resource of the requested resource quantity to the user; when the computing device is separate from the apparatus, the processing circuitry sends a resource allocation request including the second value to the computing device via interface circuitry.

In some embodiments, the processing circuitry initializes the first value as a function of a maximum resource quantity of the computing device and an amount of resource quantity used by an operating system in the computing device.

Aspects of the disclosure also provide a non-transitory computer-readable medium storing instructions which when executed by a computer cause the computer to perform the method for implementing hardware resource allocation.

It can be seen from above that, the embodiments of the present disclosure have the following beneficial effects:

In the embodiments of the present disclosure, an allocable resource quantity of a computing device is determined, a requested resource quantity that is input by a user is received, and when the requested resource quantity is not greater than the allocable resource quantity of the computing device, a hardware resource of the requested resource quantity is allocated to a user to establish an application program; and moreover, the allocable resource quantity of the computing device minus the requested resource quantity is used as an updated allocable resource quantity, thereby controlling and limiting use and preemption of a single application program on a hardware resource of the computing device, to avoid occurrence of a scenario in which a busy application program preempts an idle application program.

DESCRIPTION OF EMBODIMENTS

In order to make the foregoing objectives, features, and advantages of the present disclosure more comprehensible, the present disclosure is further described in detail in the following through specific embodiments with reference to the accompanying drawings.

In the related technology, a plurality of application programs is deployed in a single computing device, and an application program uses a hardware resource of the computing device by means of allocation and scheduling based on an operating system. For example, a busy database application may preempt a hardware resource of a computing device and use the hardware resource for computing and storage of the busy database application. However, in this scenario, an idle database application cannot obtain computing and storage resources, and a processing capability of the idle database application is greatly reduced, where a database application may include a database and a database instance, and the database instance may be understood as a processing program used to operate the database. Moreover, currently a computing device is usually allowed to be used by a plurality of tenants simultaneously, and a tenant is a user that uses a hardware resource of the computing device. In a fair multi-tenant environment, the hardware resource allocation manner in the related technology is unfair to a tenant of the idle application program. To this end, the embodiments of the present disclosure provide a method and an apparatus for implementing hardware resource allocation, to resolve unfavorable impact of resource preemption on an idle tenant, allocate a hardware resource to each tenant, and control the hardware resource used by each tenant without reducing resource use of an idle application program while ensuring that a busy application program uses a hardware resource.

Figure 1:
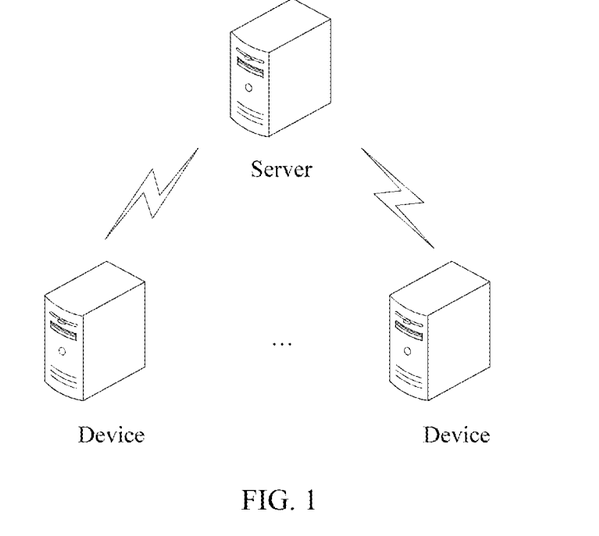
FIG. 1 is a schematic diagram of an application scenario according to an embodiment of the present disclosure.

Referring to FIG. 1, FIG. 1 shows a schematic diagram of an application scenario according to an embodiment of the present disclosure. The method for implementing hardware resource allocation provided in this embodiment of the present disclosure is described from the perspective of an apparatus for implementing hardware resource allocation, and the apparatus for implementing hardware resource allocation may be specifically loaded in a computing device (e.g., a computer) or a server. In a case, when there is one computing device, the apparatus for implementing hardware resource allocation provided in this embodiment of the present disclosure may be directly loaded in the computing device or loaded in a server, to allocate a hardware resource of the computing device. In another case, when there is a plurality of computing devices, the apparatus for implementing hardware resource allocation provided in this embodiment of the present disclosure may be loaded in a computing device or loaded in a server, to allocate a hardware resource of the computing device. Methods for implementing hardware resource allocation in the two different cases are separately described below.

Figure 2:
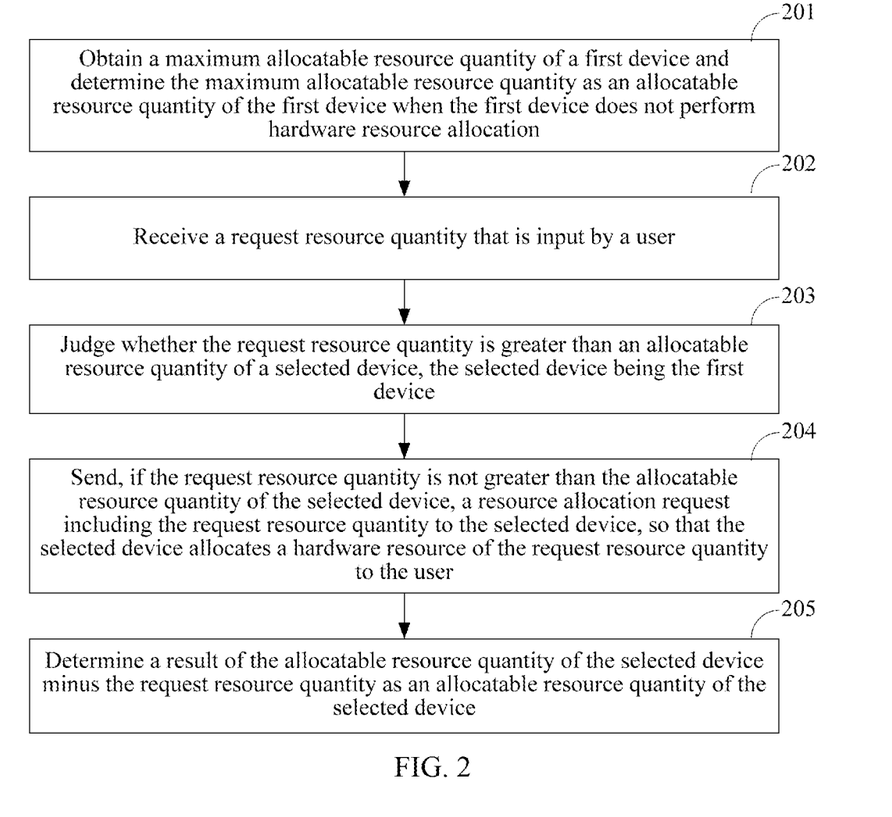
FIG. 2 is a flowchart of an embodiment of a method for implementing hardware resource allocation according to an embodiment of the present disclosure.

Referring to FIG. 2, FIG. 2 shows an embodiment of a method for implementing hardware resource allocation according to an embodiment of the present disclosure. The method for implementing hardware resource allocation may be applied to a server, and the method for implementing hardware resource allocation may include the following steps:

Step 201. Obtain a maximum allocable resource quantity of a first computing device and determine the maximum allocable resource quantity as an allocable resource quantity of the first computing device when the first computing device does not perform hardware resource allocation.

In this embodiment, when there is one computing device, that is, there is the first computing device, a hardware resource of the first computing device needs to be allocated. The maximum allocable resource quantity of the first computing device is first obtained. In some possible implementations of the present disclosure, the maximum allocable resource quantity may include a maximum allocable disk space and a maximum allocable memory space. The maximum allocable disk space is equal to a maximum disk space minus an operating-system occupied disk space, and the maximum allocable memory space is equal to a maximum memory space minus an operating-system occupied memory space. That is, the maximum allocable disk space of the first computing device is equal to the maximum disk space of the first computing device minus the operating-system occupied disk space in the first computing device, and the maximum allocable memory space of the first computing device is equal to the maximum memory space of the first computing device minus the operating-system occupied memory space in the first device. When the first computing device does not perform hardware resource allocation, that is, in an initial status, the maximum allocable resource quantity of the first computing device may be determined as the allocable resource quantity of the first computing device. In some possible implementations of the present disclosure, the allocable resource quantity may include an allocable disk space and an allocable memory space. That is, when the first computing device does not perform hardware resource allocation, the maximum allocable disk space of the first computing device is determined as the allocable disk space of the first computing device, and the maximum allocable memory space of the first computing device is determined as the allocable memory space of the first computing device. In an embodiment, step 201 may be understood as a preparation step before performing the method for implementing hardware resource allocation provided in this embodiment of the present disclosure.

If parameters are used for indication, the maximum disk space may be indicated by using SMAX, the maximum memory space may be indicated by using MMAX, the operating-system occupied disk space may be indicated by using OSS, the operating-system occupied memory space may be indicated by using OSM, the maximum allocable disk space may be indicated by using DSMAX, and the maximum allocable memory space may be indicated by using DMMAX, the foregoing relationship may be indicated as:

$$DSMAX=SMAX-OSS;\ \text{and}\ DMMAX=MMAX-OSM.$$

If the allocable disk space may be indicated by using DDS, and the allocable memory space may be indicated by using DDM, it can be known that DDM<=DMMAX, and DDS<=DSMAX.

Step 202. Receive a requested resource quantity that is input by a user.

When the user needs to request to use a resource in the computing device, a requested resource quantity may be input to a client of the user. In some possible implementations of the present disclosure, the requested resource quantity may include a requested disk space and a requested memory space. For example, the user inputs a requested disk space of 100 G and a requested memory space of 10 G to establish a database application.

A requested resource quantity of a disk space may be indicated by using SDER, and a requested resource quantity of a memory space may be indicated by using MDER.

Step 203. Judge whether the requested resource quantity is greater than an allocable resource quantity of a selected computing device, the selected computing device being the first computing device.

In this embodiment, there is one first computing device. In this case, the selected computing device is the first computing device. After the requested resource quantity that is input by the user is received, whether the requested resource quantity is greater than the allocable resource quantity of the selected computing device needs to be judged. In some possible implementations of the present disclosure, judging whether the requested resource quantity is greater than the allocable resource quantity of the selected computing device may be judging whether the requested disk space is greater than the allocable disk space and whether the requested memory space is greater than the allocable memory space. If the requested resource quantity is greater than the allocable resource quantity of the selected computing device, that is, the requested disk space is greater than the allocable disk space or the requested memory space is greater than the allocable memory space, hardware resource allocation cannot be completed, and prompt information may be sent to the user; or if the requested resource quantity is not greater than the allocable resource quantity of the selected computing device, that is, the requested disk space is not greater than the allocable disk space and the requested memory space is not greater than the allocable memory space, subsequent steps of performing hardware resource allocation of the first computing device may be performed.

Step 204. Send, if the requested resource quantity is not greater than the allocable resource quantity of the selected computing device, a resource allocation request including the requested resource quantity to the selected computing device, so that the selected computing device allocates a hardware resource of the requested resource quantity to the user.

The selected computing device may allocate the hardware resource of the requested resource quantity to the user to establish an application program instance, and a maximum usable resource quantity of the application program instance is not greater than the requested resource quantity. For example, a maximum usable memory of the application program instance is MDER, and a disk capacity is SDER.

When it is judged that the requested resource quantity is not greater than the allocable resource quantity of the selected computing device, the resource allocation request including the requested resource quantity is sent to the first computing device. If the apparatus for implementing hardware resource allocation provided in this embodiment of the present disclosure is directly loaded in the first computing device, the resource allocation request may be sent inside the first computing device; or if the apparatus for implementing hardware resource allocation provided in this embodiment of the present disclosure is directly loaded in the server, the resource allocation request may be sent from the server to the first computing device. In this embodiment, after receiving the resource allocation request, the first computing device may allocate the hardware resource of the requested resource quantity to the user. Specifically, the first computing device may allocate the hardware resource of the size of the requested disk space and the size of the requested memory space to the user sending the requested resource quantity. In some possible implementations of the present disclosure, the selected computing device may be specifically configured to allocate the hardware resource of the requested resource quantity to the user to establish a database application. In this embodiment, the selected computing device may be the first computing device.

Step 205. Determine a result of the allocable resource quantity of the selected computing device minus the requested resource quantity as an allocable resource quantity of the selected computing device.

After the selected computing device performs hardware resource allocation, the allocable resource quantity of the selected computing device needs to be updated, and a result of the original allocable resource quantity minus the requested resource quantity is an updated allocable resource quantity. In some possible implementations of the present disclosure, a result of the allocable disk space of the selected computing device minus the requested disk space may be determined as the allocable disk space of the selected computing device, and a result of the allocable memory space of the selected computing device minus the requested memory space may be determined as the allocable memory space of the selected computing device. In this embodiment, the selected computing device may be the first computing device.

In this way, in this embodiment of the present disclosure, an allocable resource quantity of a computing device is determined, a requested resource quantity that is input by a user is received, and when the requested resource quantity is not greater than the allocable resource quantity of the computing device, a hardware resource of the requested resource quantity is allocated to a user to establish an application program; and moreover, the allocable resource quantity of the computing device minus the requested resource quantity is used as an updated allocable resource quantity, thereby controlling and limiting use and preemption of a single application program on a hardware resource of the computing device, to avoid occurrence of a scenario in which a busy application program preempts an idle application program.

Figure 3:
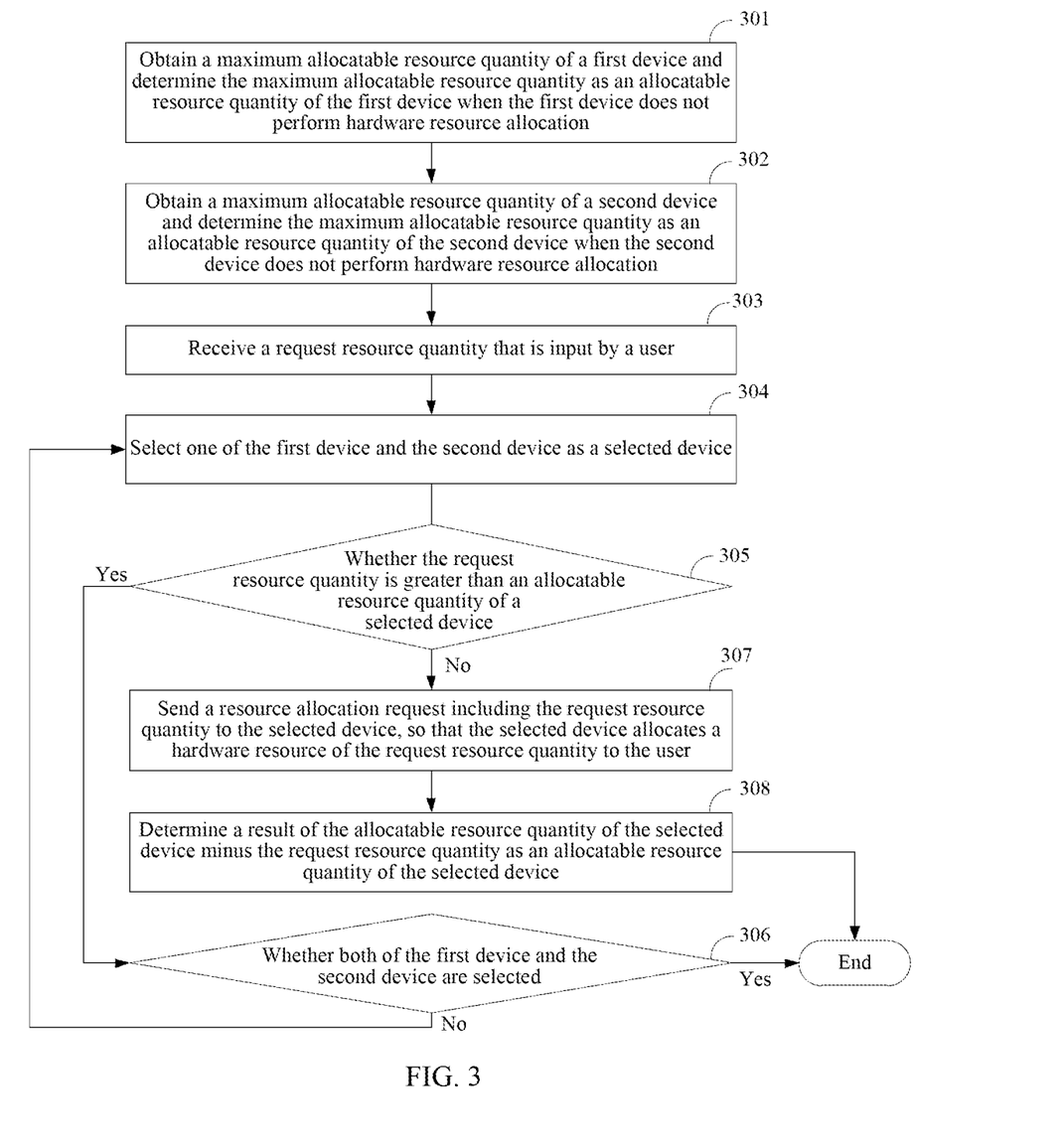
FIG. 3 is another flowchart of an embodiment of a method for implementing hardware resource allocation according to an embodiment of the present disclosure.

Based on the foregoing embodiment, a case in which there is a plurality of computing devices further exists, that is, in addition to the first computing device, one or more second computing devices may further exist. When the user needs to request to use a resource in a computing device, one of the first computing device and the second computing device may be selected to allocate a hardware resource of the computing device to the user. Therefore, in some possible implementations of the present disclosure, the method may further include: obtaining a maximum allocable resource quantity of a second computing device and determining the maximum allocable resource quantity as an allocable resource quantity of the second computing device when the second computing device does not perform hardware resource allocation; selecting, after the receiving a requested resource quantity that is input by a user and before the judging whether the requested resource quantity is greater than an allocable resource quantity of a selected computing device, one of the first computing device and the second computing device as a selected computing device; judging, if the requested resource quantity is greater than the allocable resource quantity of the selected computing device, whether both of the first computing device and the second computing device are selected; and reselecting, if not both of the first computing device and the second computing device are selected, one of the first computing device and the second computing device as a selected computing device. Referring to FIG. 3, FIG. 3 shows an embodiment of a method for implementing hardware resource allocation according to an embodiment of the present disclosure. The method may be applied to a server, and this embodiment may include the following steps:

Step 301. Obtain a maximum allocable resource quantity of a first computing device and determine the maximum allocable resource quantity as an allocable resource quantity of the first computing device when the first computing device does not perform hardware resource allocation.

Step 302. Obtain a maximum allocable resource quantity of a second computing device and determine the maximum allocable resource quantity as an allocable resource quantity of the second computing device when the second computing device does not perform hardware resource allocation.

Similarly, in some possible implementations of the present disclosure, the maximum allocable resource quantity may include a maximum allocable disk space and a maximum allocable memory space. The maximum allocable disk space is equal to a maximum disk space minus an operating-system occupied disk space, and the maximum allocable memory space is equal to a maximum memory space minus an operating-system occupied memory space. That is, the maximum allocable disk space of the second computing device is equal to the maximum disk space of the second computing device minus the operating-system occupied disk space in the second computing device, and the maximum allocable memory space of the second computing device is equal to the maximum memory space of the second computing device minus the operating-system occupied memory space in the second computing device. When the second computing device does not perform hardware resource allocation, that is, in an initial status, the maximum allocable resource quantity of the second computing device may be determined as the allocable resource quantity of the second computing device. In some possible implementations of the present disclosure, the allocable resource quantity may include an allocable disk space and an allocable memory space. That is, when the second computing device does not perform hardware resource allocation, the maximum allocable disk space of the second computing device is determined as the allocable disk space of the second computing device, and the maximum allocable memory space of the second computing device is determined as the allocable memory space of the second computing device.

In an embodiment, step 301 and step 302 may be both understood as preparation steps before performing the method for implementing hardware resource allocation provided in this embodiment of the present disclosure.

Step 303. Receive a requested resource quantity that is input by a user.

In some possible implementations of the present disclosure, the requested resource quantity may include a requested disk space and a requested memory space.

Step 304. Select one of the first computing device and the second computing device as a selected computing device.

In actual application, one of the first computing device and the second computing device may be randomly selected as the selected computing device, or one of the first computing device and the second computing device may be selected as the selected computing device according to an order such as an identifier order.

Step 305. Judge whether the requested resource quantity is greater than an allocable resource quantity of a selected computing device, and if yes, enter step 306, or if no, enter step 307.

Step 306. Judge whether both of the first computing device and the second computing device are selected, and if yes, end, or if no, return to step 304.

If the requested resource quantity is greater than the allocable resource quantity of the selected computing device, that is, the requested disk space is greater than the allocable disk space of the selected computing device or the requested memory space is greater than the allocable memory space of the selected computing device, the selected computing device cannot complete hardware resource allocation, and another computing device needs to be selected. Before a selected computing device is reselected, whether both of the first computing device and the second computing device are selected is first judged. If no, return to reselect one of the first computing device and the second computing device as a selected computing device. If both of the first computing device and the second computing device are selected, there is currently no computing device that may satisfy the requested resource quantity, and the hardware resource allocation process ends.

Step 307. Send a resource allocation request including the requested resource quantity to the selected computing device, so that the selected computing device allocates a hardware resource of the requested resource quantity to the user.

When it is judged that the requested resource quantity is not greater than the allocable resource quantity of the selected computing device, that is, the requested disk space is not greater than the allocable disk space of the selected computing device and the requested memory space is not greater than the allocable memory space of the selected computing device, the resource allocation request including the requested resource quantity may be sent to the selected computing device. After receiving the resource allocation request, the selected computing device may allocate the hardware resource of the requested resource quantity to the user. Specifically, the selected computing device may allocate the hardware resource of the size of the requested disk space and the size of the requested memory space to the user sending the requested resource quantity. In some possible implementations of the present disclosure, the selected computing device may be specifically configured to allocate the hardware resource of the requested resource quantity to the user to establish a database application.

Step 308. Determine a result of the allocable resource quantity of the selected computing device minus the requested resource quantity as an allocable resource quantity of the selected computing device.

After the selected computing device performs hardware resource allocation, the allocable resource quantity of the selected computing device needs to be updated, and a result of the original allocable resource quantity minus the requested resource quantity is an updated allocable resource quantity. In some possible implementations of the present disclosure, a result of the allocable disk space of the selected computing device minus the requested disk space may be determined as the allocable disk space of the selected computing device, and a result of the allocable memory space of the selected computing device minus the requested memory space may be determined as the allocable memory space of the selected computing device.

In this way, in this embodiment of the present disclosure, an allocable resource quantity of a plurality of computing devices is determined, one computing device is selected from the plurality of computing devices, a requested resource quantity that is input by a user is received, and when the requested resource quantity is not greater than the allocable resource quantity of the computing device, a hardware resource of the requested resource quantity is allocated to a user to establish an application program; and moreover, the allocable resource quantity of the computing device minus the requested resource quantity is used as an updated allocable resource quantity, thereby allocating the hardware resource among the plurality of computing devices, and controlling and limiting use and preemption of a single application program on a hardware resource of the computing device, to avoid occurrence of a scenario in which a busy application program preempts an idle application program.

Figure 4:
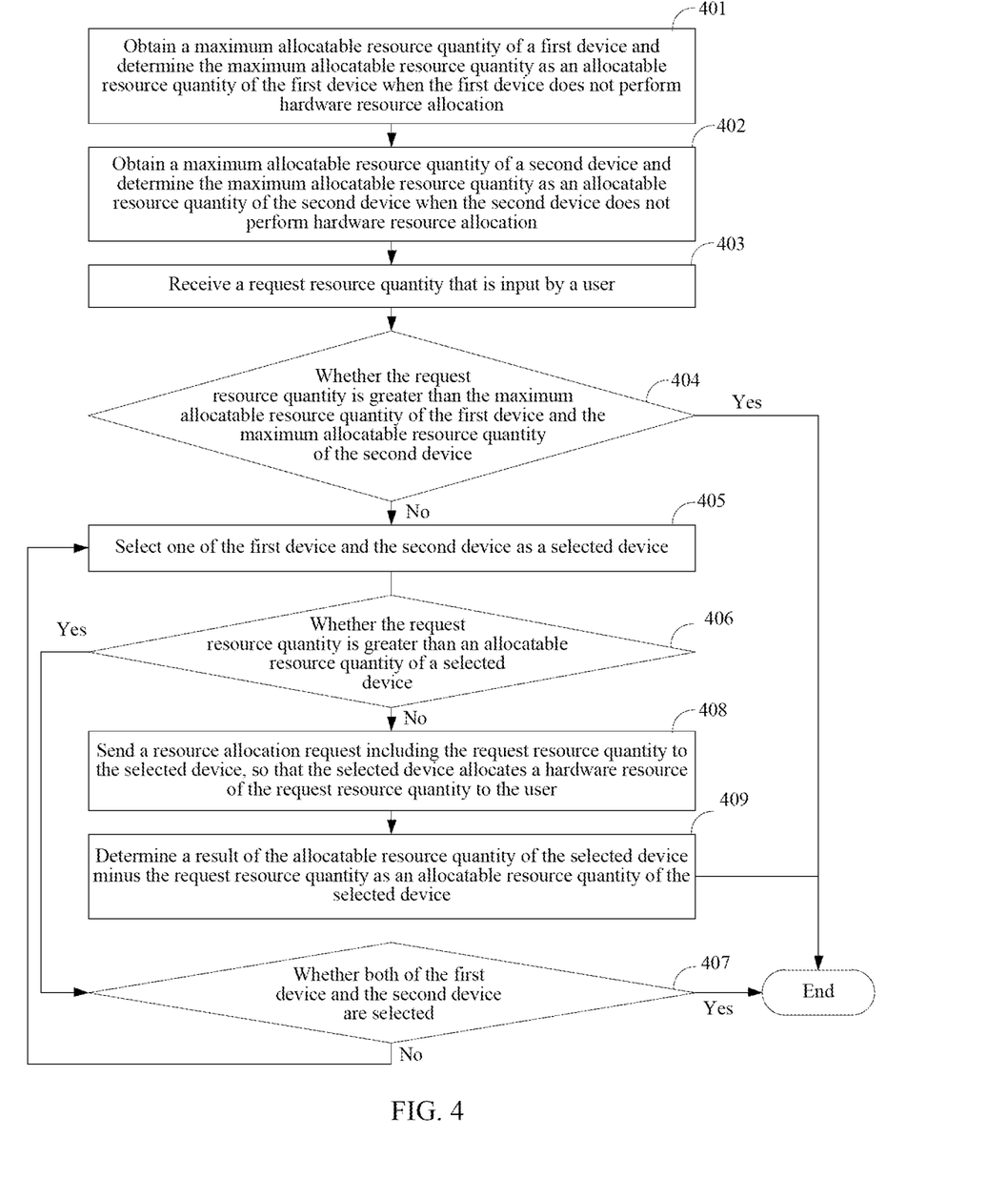
FIG. 4 is another flowchart of an embodiment of a method for implementing hardware resource allocation according to an embodiment of the present disclosure.

Based on the foregoing embodiment of the method for implementing hardware resource allocation, in some possible implementations of the present disclosure, before the selecting one of the first computing device and the second computing device as a selected computing device, the method may further include: judging whether the requested resource quantity is greater than the maximum allocable resource quantity of the first computing device and the maximum allocable resource quantity of the second computing device; and selecting, if the requested resource quantity is not greater than the maximum allocable resource quantity of the first computing device and the maximum allocable resource quantity of the second computing device, one of the first computing device and the second computing device as a selected computing device. Referring to FIG. 4, FIG. 4 shows an embodiment of a method for implementing hardware resource allocation according to an embodiment of the present disclosure. The method may be applied to a server, and this embodiment may include the following steps:

Step 401. Obtain a maximum allocable resource quantity of a first computing device and determine the maximum allocable resource quantity as an allocable resource quantity of the first computing device when the first computing device does not perform hardware resource allocation.

Step 402. Obtain a maximum allocable resource quantity of a second computing device and determine the maximum allocable resource quantity as an allocable resource quantity of the second computing device when the second computing device does not perform hardware resource allocation.

Step 403. Receive a requested resource quantity that is input by a user.

Step 404. Judge whether the requested resource quantity is greater than the maximum allocable resource quantity of the first computing device and the maximum allocable resource quantity of the second computing device, and if yes, end, or if no, enter step 405.

After the requested resource quantity that is input by the user is received, whether the requested resource quantity is greater than the maximum allocable resource quantity of the first computing device and the maximum allocable resource quantity of the second computing device is first judged. If the requested resource quantity is greater than the maximum allocable resource quantity of each computing device, hardware resource allocation cannot be performed, computing device selection does not need to be performed, and the hardware resource allocation process directly ends, so as to save a resource and consumed time for performing hardware resource allocation. Specifically, this step may be implemented by judging whether the requested disk space is greater than the allocable disk space of the first computing device and the allocable disk space of the second computing device and whether the requested memory space is greater than the allocable memory space of the first computing device and the allocable memory space of the second computing device, and if the requested disk space is greater than the allocable disk space of the first computing device and the allocable disk space of the second computing device and the requested memory space is greater than the allocable memory space of the first computing device and the allocable memory space of the second computing device, directly end, or if the requested disk space is not greater than the allocable disk space of the first computing device and the allocable disk space of the second computing device or the requested memory space is not greater than the allocable memory space of the first computing device and the allocable memory space of the second computing device, enter step 405.

Step 405. Select one of the first computing device and the second computing device as a selected computing device.

Step 406. Judge whether the requested resource quantity is greater than an allocable resource quantity of a selected computing device, and if yes, enter step 407, or if no, enter step 408.

Step 407. Judge whether both of the first computing device and the second computing device are selected, and if yes, end, or if no, return to step 405.

Step 408. Send a resource allocation request including the requested resource quantity to the selected computing device, so that the selected computing device allocates a hardware resource of the requested resource quantity to the user.

Step 409. Determine a result of the allocable resource quantity of the selected computing device minus the requested resource quantity as an allocable resource quantity of the selected computing device.

In this embodiment, other steps than step 404 are similar to those in the foregoing embodiment. For corresponding description, refer to the foregoing embodiment. Details are not described herein again.

In this way, in this embodiment of the present disclosure, an allocable resource quantity of a plurality of computing devices is determined, one computing device is selected from the plurality of computing devices, a requested resource quantity that is input by a user is received, and when the requested resource quantity is not greater than the allocable resource quantity of the computing device, a hardware resource of the requested resource quantity is allocated to a user to establish an application program; and moreover, the allocable resource quantity of the computing device minus the requested resource quantity is used as an updated allocable resource quantity, thereby allocating the hardware resource among the plurality of computing devices, and controlling and limiting use and preemption of a single application program on a hardware resource of the computing device, to avoid occurrence of a scenario in which a busy application program preempts an idle application program.

Figure 5:
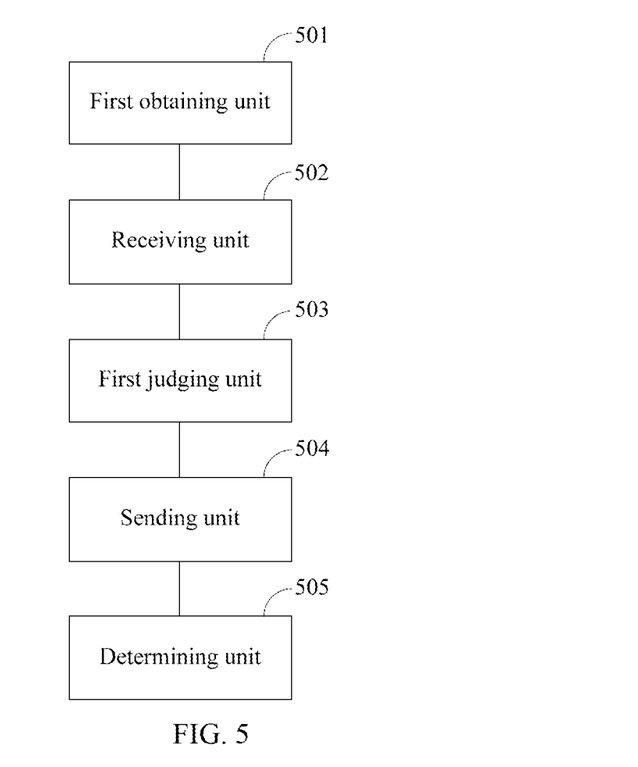
FIG. 5 is a schematic diagram of an embodiment of an apparatus for implementing hardware resource allocation according to an embodiment of the present disclosure.

Referring to FIG. 5, FIG. 5 shows an embodiment of an apparatus for implementing hardware resource allocation according to an embodiment of the present disclosure. The apparatus may include:

a first obtaining unit 501, configured to obtain a maximum allocable resource quantity of a first computing device and determine the maximum allocable resource quantity as an allocable resource quantity of the first computing device when the first computing device does not perform hardware resource allocation;

a receiving unit 502, configured to receive a requested resource quantity that is input by a user;

a first judging unit 503, configured to judge whether the requested resource quantity is greater than an allocable resource quantity of a selected computing device, the selected computing device being the first computing device;

a sending unit 504, configured to send, if a judging result of the first judging unit is that the requested resource quantity is not greater than the allocable resource quantity of the selected computing device, a resource allocation request including the requested resource quantity to the selected computing device, so that the selected computing device allocates a hardware resource of the requested resource quantity to the user to establish an application program instance, a maximum usable resource quantity of the application program instance being not greater than the requested resource quantity; and a determining unit 505, configured to determine a result of the allocable resource quantity of the selected computing device minus the requested resource quantity as an allocable resource quantity of the selected computing device.

In some possible implementations of the present disclosure, the apparatus for implementing hardware resource allocation provided in this embodiment of the present disclosure may further include:

a second obtaining unit, configured to obtain a maximum allocable resource quantity of a second computing device, and determining, when the second computing device does not perform hardware resource allocation, the maximum allocable resource quantity as an allocable resource quantity of the second computing device; and a selection unit, configured to select, after the receiving unit receives the requested resource quantity that is input by the user and before the first judging unit judges whether the requested resource quantity is greater than the allocable resource quantity of the selected computing device, one of the first computing device and the second computing device as a selected computing device.

In some possible implementations of the present disclosure, the apparatus for implementing hardware resource allocation provided in this embodiment of the present disclosure may further include:

a second judging unit, configured to judge, if a judging result of the first judging unit is that the requested resource quantity is greater than the allocable resource quantity of the selected computing device, whether both of the first computing device and the second computing device are selected; and the selection unit is further configured to reselect, if a judging result of the second judging unit is that not both of the first computing device and the second computing device are selected, one of the first computing device and the second computing device as a selected computing device.

In some possible implementations of the present disclosure, the apparatus for implementing hardware resource allocation provided in this embodiment of the present disclosure may further include:

a third judging unit, configured to judge whether the requested resource quantity is greater than the maximum allocable resource quantity of the first computing device and the maximum allocable resource quantity of the second computing device; and the selection unit is further configured to select, if a judging result of the third judging unit is that the requested resource quantity is not greater than the maximum allocable resource quantity of the first computing device and the maximum allocable resource quantity of the second computing device, one of the first computing device and the second computing device as a selected computing device.

In some possible implementations of the present disclosure, the selected computing device may be specifically configured to allocate the hardware resource of the requested resource quantity to the user to establish a database application.

In some possible implementations of the present disclosure, the maximum allocable resource quantity includes a maximum allocable disk space and a maximum allocable memory space, the maximum allocable disk space is equal to a maximum disk space minus an operating-system occupied disk space, and the maximum allocable memory space is equal to a maximum memory space minus an operating-system occupied memory space; the allocable resource quantity includes an allocable disk space and an allocable memory space; and the requested resource quantity includes a requested disk space and a requested memory space.

In this way, in this embodiment of the present disclosure, an allocable resource quantity of a computing device is determined, a requested resource quantity that is input by a user is received, and when the requested resource quantity is not greater than the allocable resource quantity of the computing device, a hardware resource of the requested resource quantity is allocated to a user to establish an application program; and moreover, the allocable resource quantity of the computing device minus the requested resource quantity is used as an updated allocable resource quantity, thereby controlling and limiting use and preemption of a single application program on a hardware resource of the computing device, to avoid occurrence of a scenario in which a busy application program preempts an idle application program.

Figure 6:
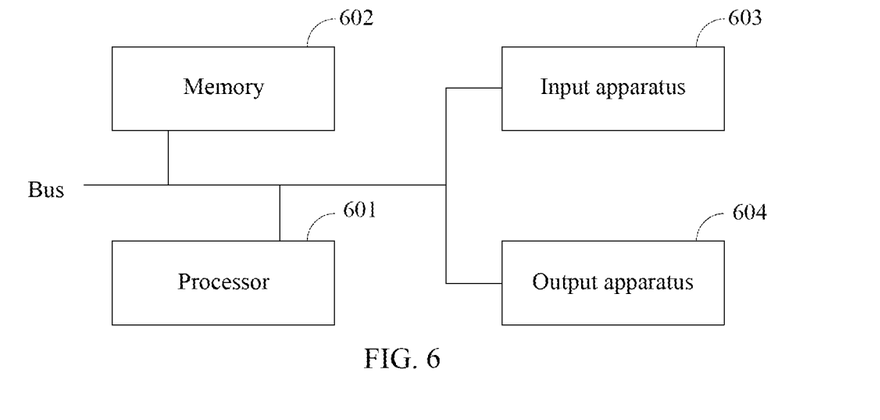
FIG. 6 is a schematic structural diagram of a server according to an embodiment of the present disclosure.

Optionally, an embodiment of the present disclosure further provides a server. As shown in FIG. 6, the server may include:

a processor 601, a memory 602, an input apparatus 603 and an output apparatus 604. There may be one or more processors 601 in the server, and in FIG. 6, one processor is used as an example. In some embodiments of the present disclosure, the processor 601, the memory 602, the input apparatus 603 and the output apparatus 604 may be connected by using a bus or in another manner, where connection performed by using a bus is used as an example in FIG. 6.

The memory 602 may be configured to store a software program and a module, and the processor 601 runs the software program and the module that are stored in the memory 602, so as to perform various function applications of the server and data processing. The memory 602 may mainly include a program storage area and a data storage area. The program storage area may store an operating system, an application program used by at least one function, and the like. In addition, the memory 602 may include a high speed random access memory, and may also include a non-volatile memory such as at least one magnetic disk storage device, a flash memory, or another volatile solid-state storage device. The input apparatus 603 may be configured to receive input digit or character information, and generate a key signal input related to the user setting and function control of the server.

Specifically, in this embodiment, the processor 601 may load, according to the following instructions, executable files corresponding to processes of one or more application programs into the memory 602. The processor 601 runs the application programs stored in the memory 602, to implement various functions:

obtaining a maximum allocable resource quantity of a first computing device and determining the maximum allocable resource quantity as an allocable resource quantity of the first computing device when the first computing device does not perform hardware resource allocation;

receiving a requested resource quantity that is input by a user;

judging whether the requested resource quantity is greater than an allocable resource quantity of a selected computing device, the selected computing device being the first computing device;

sending, if the requested resource quantity is not greater than the allocable resource quantity of the selected computing device, a resource allocation request including the requested resource quantity to the selected computing device, so that the selected computing device allocates a hardware resource of the requested resource quantity to the user to establish an application program instance, a maximum usable resource quantity of the application program instance being not greater than the requested resource quantity; and determining a result of the allocable resource quantity of the selected computing device minus the requested resource quantity as an allocable resource quantity of the selected computing device.

Optionally, the various functions further include:

obtaining a maximum allocable resource quantity of a second computing device, and determining, when the second computing device does not perform hardware resource allocation, the maximum allocable resource quantity as an allocable resource quantity of the second computing device; and selecting, after the receiving a requested resource quantity that is input by a user and before the judging whether the requested resource quantity is greater than an allocable resource quantity of a selected computing device, one of the first computing device and the second computing device as a selected computing device.

Optionally, the various functions further include:

judging, if the requested resource quantity is greater than the allocable resource quantity of the selected computing device, whether both of the first computing device and the second computing device are selected; and reselecting, if not both of the first computing device and the second computing device are selected, one of the first computing device and the second computing device as a selected computing device.

Optionally, before the selecting one of the first computing device and the second computing device as a selected computing device, the various functions further include:

judging whether the requested resource quantity is greater than the maximum allocable resource quantity of the first computing device and the maximum allocable resource quantity of the second computing device; and selecting, if the requested resource quantity is not greater than the maximum allocable resource quantity of the first computing device and the maximum allocable resource quantity of the second computing device, one of the first computing device and the second computing device as a selected computing device.

Optionally, the maximum allocable resource quantity includes a maximum allocable disk space and a maximum allocable memory space, the maximum allocable disk space is equal to a maximum disk space minus an operating-system occupied disk space, and the maximum allocable memory space is equal to a maximum memory space minus an operating-system occupied memory space; the allocable resource quantity includes an allocable disk space and an allocable memory space; and the requested resource quantity includes a requested disk space and a requested memory space.

In this way, in this embodiment of the present disclosure, an allocable resource quantity of a computing device is determined, a requested resource quantity that is input by a user is received, and when the requested resource quantity is not greater than the allocable resource quantity of the computing device, a hardware resource of the requested resource quantity is allocated to a user to establish an application program; and moreover, the allocable resource quantity of the computing device minus the requested resource quantity is used as an updated allocable resource quantity, thereby controlling and limiting use and preemption of a single application program on a hardware resource of the computing device, to avoid occurrence of a scenario in which a busy application program preempts an idle application program.

It is noted that the embodiments in this specification are described in a progressive manner. Description of each of the embodiments focuses on differences from other embodiments, and reference may be made to each other for the same or similar parts among respective embodiments. The system or apparatus embodiments are substantially similar to the method embodiments and therefore are briefly described, and reference may be made to the method embodiments for the associated part.

It is further noted that the relational terms herein such as first and second are used only to differentiate an entity or operation from another entity or operation, and do not need or imply any actual relationship or sequence between these entities or operations. Moreover, the terms "include", "comprise", and any variants thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. Unless otherwise specified, an element limited by "include a/an . . . " does not exclude other same elements related in the process, the method, the article, or the device that includes the element.

In combination with the embodiments herein, steps of the method or algorithm described may be directly implemented using hardware, a software module executed by a processor, or the combination thereof. The software module may be placed in a random access memory (RAM), a memory, a read-only memory (ROM), an electrically programmable ROM (EPROM), an electrically erasable programmable ROM (EEPROM), a register, a hard disk, a removable magnetic disk, a CD-ROM, or any storage medium of other forms well-known in the technical field.

In the foregoing embodiments, all or some of the steps may be implemented by software, hardware, firmware, or any combination thereof. When implemented by using software, all or some of the steps may be implemented in a form of a computer program product.

The computer program product includes one or more computer instructions. When the program instruction of the computer is loaded and executed on the computer, all or some of the steps are generated according to the process or function described in the embodiments of the present disclosure. The computer may be a general-purpose computer, a special-purpose computer, a computer network, or another programmable apparatus. The computer instruction may be stored in a computer readable storage medium, or transmitted from a computer readable storage medium to another computer readable storage medium. For example, the computer instruction may be transmitted from a website, computer, server or data center to another website, computer, server or data center in a wired (for example, coaxial cable, optical fiber, or digital subscriber line (DSL)) or wireless (for example, infrared, radio, or microwave) manner. The computer readable storage medium may be any usable medium that a computer can store, or a data storage device such as a server or a data center in which one or more usable mediums are integrated. The usable medium may be a non-transitory computer-readable medium such as a magnetic medium (for example, a floppy disk, a hard disk, or a magnetic tape), an optical medium (for example, a DVD), a semiconductor medium (for example, a Solid State Disk (SSD)), or the like.

It is noted that the various modules, submodules, units, subunits, and components in the present disclosure can be implemented using any suitable technology. For example, a module or a unit can be implemented using processing circuitry. In an example, a module or a unit can be implemented using integrated circuit (IC). In another example, a module or a unit can be implemented as a processor executing software instructions. In another example, interface circuitry is used to implement receiving unit (or module) and/or sending unit (or module).

A person of ordinary skill in the art may understand that all or some of the steps of the methods in the foregoing embodiments may be completed by a program instructing relevant hardware. The program may be stored in a computer readable storage medium. The storage medium may be a non-transitory computer-readable medium such as a ROM, a RAM, a magnetic disk, an optical disc, or the like.

The above description of the disclosed embodiments enables persons skilled in the art to implement or use the present disclosure. Various modifications to these embodiments may be implemented by the persons skilled in the art, and the general principles defined in the present disclosure may be implemented in other embodiments without departing from the spirit and scope of the present disclosure. Therefore, the present disclosure is not limited to these embodiments illustrated in the present disclosure, but needs to conform to the broadest scope consistent with the principles and novel features disclosed in the present disclosure.

What is claimed is:

1. A method of hardware resource allocation, comprising:
obtaining, by processing circuitry of an apparatus, a first value indicating an allocable quantity of hardware resources in a computing device;
receiving, by the processing circuitry, a user request associated with a user, the user request specifying a second value indicating a requested quantity of hardware resources usable by one or more application program instances to be established by the user;
determining, by the processing circuitry, whether the second value is less than or equal to the first value;
in response to the second value being determined to be less than or equal to the first value,
requesting the computing device to allocate hardware resources of the requested quantity in the computing device, the allocated hardware resources in the computing device being configured to be free from being preempted by another application program instance established by another user, and
updating, by the processing circuitry, the allocable quantity of hardware resources in the computing device by subtracting the second value from the first value; and
in response to the second value being determined to be greater than the first value, requesting an other computing device to allocate hardware resources of the requested quantity in the other computing device.

2. The method of claim 1, wherein the allocable quantity of hardware resources corresponds to at least one of a disk space and a memory space in the computing device.

3. The method of claim 1, further comprising:
selecting, by the processing circuitry, the computing device from a plurality of available computing devices.

4. The method of claim 1, further comprising:
in response to the second value being determined to be greater than the first value:
obtaining, by the processing circuitry, a third value indicating an allocable quantity of hardware resources in an other computing device; and
in response to the second value being determined to be less than or equal to the third value, requesting the other computing device to allocate other hardware resources of the requested quantity in the other computing device.

5. The method of claim 1, wherein the one or more application program instances correspond to a database application.

6. The method of claim 1, further comprising, in response to the second value being determined to be less than or equal to the first value, performing at least one of:
when the computing device is separate from the apparatus, sending, via interface circuitry of the apparatus, a resource allocation request including the second value to the computing device; and
when the computing device is integrated in the apparatus, allocating, by the processing circuitry, the hardware resources of the requested resource quantity to the user.

7. The method of claim 1, further comprising:
initializing the first value as a function of a maximum resource quantity of the computing device and an amount of resource quantity used by an operating system in the computing device.

8. An apparatus, comprising:
processing circuitry configured to:
obtain a first value indicating an allocable quantity of hardware resources in a computing device;
receive a user request associated with a user, the user request specifying a second value indicating a requested quantity of hardware resources usable by one or more application program instances to be established by the user;

determine whether the second value is less than or equal to the first value;

in response to the second value being determined to be less than or equal to the first value, request the computing device to allocate hardware resources of the requested quantity in the computing device, the allocated hardware resources in the computing device being configured to be free from being preempted by another application program instance established by another user, and update the allocable quantity of hardware resources in the computing device by subtracting the second value from the first value; and in response to the second value being determined to be greater than the first value, request an other computing device to allocate hardware resources of the requested quantity in the other computing device.

9. The apparatus of claim 8, wherein the allocable quantity of hardware resources corresponds to at least one of a disk space and a memory space in the computing device.

10. The apparatus of claim 8, wherein the processing circuitry is further configured to:

select the computing device from a plurality of available computing devices.

11. The apparatus of claim 8, wherein the processing circuitry is further configured to:

in response to the second value being determined to be greater than the first value:

obtain a third value indicating an allocable quantity of hardware resources in an other computing device; and in response to the second value being determined to be less than or equal to the third value, request the other computing device to allocate other hardware resources of the requested quantity in the other computing device.

12. The apparatus of claim 8, wherein the one or more application program instances correspond to a database application.

13. The apparatus of claim 8, wherein the processing circuitry is further configured to:

in response to the second value being determined to be less than or equal to the first value, perform at least one of when the computing device is separate from the apparatus, sending a resource allocation request including the second value to the computing device; and when the computing device is integrated in the apparatus, allocating the hardware resources of the requested resource quantity to the user.

14. The apparatus of claim 8, wherein the processing circuitry is further configured to:

initialize the first value as a function of a maximum resource quantity of the computing device and an amount of resource quantity used by an operating system in the computing device.

15. A non-transitory computer-readable medium storing computer-readable instructions therein which when executed by a computer cause the computer to perform:

obtaining a first value indicating an allocable quantity of hardware resources in a computing device;

receiving a user request associated with a user, the user request specifying a second value indicating a requested quantity of hardware resources usable by one or more application program instances to be established by the user;

determining whether the second value is less than or equal to the first value;

in response to the second value being determined to be less than or equal to the first value, requesting the computing device to allocate hardware resources of the requested quantity in the computing device, the allocated hardware resources in the computing device being configured to be free from being preempted by another application program instance established by another user, and updating the allocable quantity of hardware resources in the computing device by subtracting the second value from the first value; and in response to the second value being determined to be greater than the first value, requesting an other computing device to allocate hardware resources of the requested quantity in the other computing device.

16. The non-transitory computer-readable medium of claim 15, wherein the allocable quantity of hardware resources corresponds to at least one of a disk space and a memory space in the computing device.

17. The non-transitory computer-readable medium of claim 15, wherein the stored computer-readable instructions further cause the computer to perform:

selecting the computing device from a plurality of available computing devices.

18. The non-transitory computer-readable medium of claim 15, wherein the stored computer-readable instructions further cause the computer to perform:

in response to the second value being determined to be greater than the first value:

obtaining a third value indicating an allocable quantity of hardware resources in an other computing device; and in response to the second value being determined to be less than or equal to the third value, requesting the other computing device to allocate other hardware resources of the requested quantity in the other computing device.

19. The non-transitory computer-readable medium of claim 15, wherein the stored computer-readable instructions further cause the computer to perform, in response to the second value being determined to be less than or equal to the first value, performing at least one of:

when the computing device is separate from the computer, sending a resource allocation request including the second value to the computing device; and when the computing device is integrated in the computer, allocating the piece of hardware resources of the requested resource quantity to the user.

20. The non-transitory computer-readable medium of claim 15, wherein the stored computer-readable instructions further cause the computer to perform:

initializing the first value as a function of a maximum resource quantity of the computing device and an amount of resource quantity used by an operating system in the computing device.

* * * * *